Sept. 28, 1954  W. C. HOUSE  2,690,151
MEANS AND METHOD OF MAKING AIRFOILS
Filed March 26, 1952
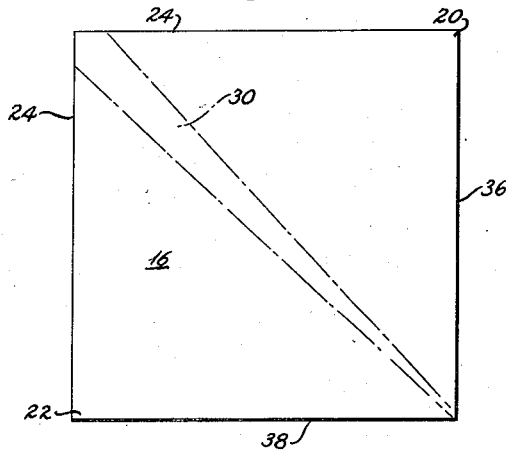
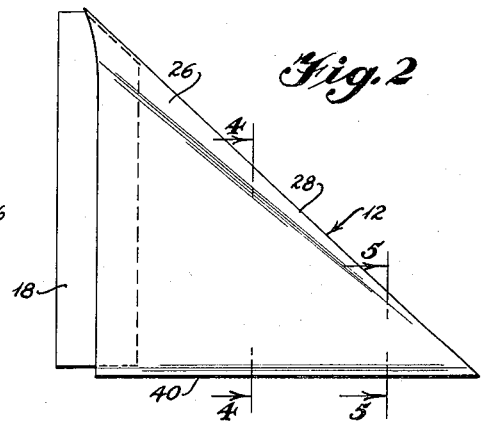
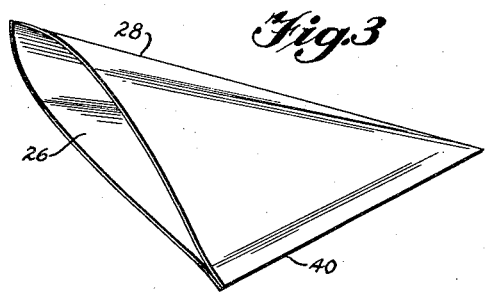
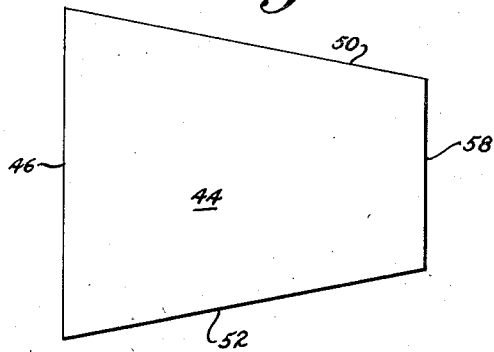
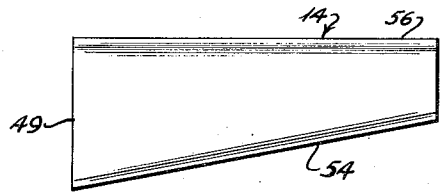
INVENTOR.
William C. House
BY

Patented Sept. 28, 1954

2,690,151

UNITED STATES PATENT OFFICE 2,690,151

MEANS AND METHOD OF MAKING AIRFOILS

William Carl House, Pasadena, Calif.

Application March 26, 1952, Serial No. 278,725

1 Claim. (Cl. 113—116)

(Granted under Title 35, U. S. Code (1952), sec. 266)

The general object of the invention is to teach a method of making a wing which deviates widely from accepted wing making techniques and to provide wings which are very simple in construction and furnish maximum compartment space for storage of fuel, explosives, mechanisms and the like within the wings, inasmuch as there is no need for internal bracing contained within these wing structures, and the wing is made of a flat sheet of relatively stiff but readily bendable material which is shaped to the desired configuration by the supporting frame at the root of the wing.

A more specific object of the invention is to form a wing, preferably of monobloc construction, by shaping and cutting one edge portion of a flat sheet to fit around a supporting root frame that has the desired shape of the section of the wing and as an incident to the shaping, form the leading edge from the region of the sheet intermediate two other edges of the sheet, and then form the trailing edge of the wing by superposing and fastening said two edges together.

Another object of the invention is to provide a wing as described above, with geometrically similar sections from the root substantially to the tip by shaping the front part of the root section around a root support and permitting a longitudinal region of the sheet extending from the front part of the root section, to bend into a shape conforming to the desired shape of the front of all the sections, and drawing together the edges to form the trailing edge of the wing.

Other objects and features will become apparent from the following description of the accompanying drawing and the parent application.

In the drawing:

Fig. 1 is a plan view of a flat sheet of bendable material from which the wing of Fig. 3 is made.

Fig. 2 is a plan view of a wing made by the method described herein, with a root section support shown in use.

Fig. 3 is a perspective view of one form of wing embodying the principles of the invention.

Fig. 4 is a chordwise sectional view of the wing taken on the line 4—4 of Fig. 2.

Fig. 5 is a chordwise sectional view taken on the line 5—5 of Fig. 2, the purpose of this view and Fig. 4 being to show the geometrical similarity of the sections of the wing at any of the stations from wing root to tip.

Fig. 6 is a plan view of a sheet from which the wing of Fig. 7 is made.

Fig. 7 is a plan view of a wing with a rectangular tip, this wing being made from a sheet of a different pattern from that of Fig. 1.

In Figs. 2 and 7 there are wings 12 and 14 which differ in planform, the former being substantially triangular and the latter having a substantially rectangular tip. Both of these wings are made in accordance with the teachings of the present invention, and the illustration shows that the principles of the invention are applicable to various wing configurations.

In practice it has been thought that ribs, spars, and stringers or mechanical elemental substitutes are required in order to have sufficient strength and rigidity of construction. However, it has been found that at least for pilotless craft, as a guided missile, such structures can be omitted without practical loss of the functions thereof. Starting from a flat sheet 16 of bendable material, for example almost any of the various aircraft wing skin metals, the wing 12 can be made by shaping it manually or by machine, around a root section support 18 serving as a template or pattern and having the desired root section shape. The support 18 may be a root shaped rib that is fastened to a fuselage or another wing, or, it may be removed after the wing is formed thereon. The procedure, after selection of a properly shaped support 18, is to grasp the corners 20 and 22 and bring them together in overlapping relation, with the first edges 24 being shaped around the root section support 18. The material of the sheet 16 adjacent to the edges 24 constitutes means for forming the root 26 of the wing 12. Simultaneously with this operation the leading edge 28 of the wing is formed from a region of the sheet 16 from the inboard end to the tip of the wing, this region being approximately identified at 30 between the broken lines in Fig. 1. In shaping the sheet 16 with its edge 24 on the support 18, the entire flat sheet assumes a generally airfoil configuration. Then the adjacent edges 36 and 38 are brought together, superposing one upon the other in order to form the trailing edge 40 of wing 12. The portions of the sheet 16 near the edges 36 and 38, together with the actual edges and rivets, welds or the like constitute means for forming said trailing edge. Parts of the sheet between the edges 36 and 38 define the upper and lower surfaces of the wing. By bringing the edges 36 and 38 together after or simultaneous with the shaping of the root section, the entire wing is made with geometrically similar sections as shown in Figs. 4 and 5 due to the natural flexing characteristic of the sheet 16. The sheet would flex and bend in a substantially undetermined manner if it were simply twisted or bent, but when the support 18 is used, and the edges 36 and 38 are brought together and fixed to each other, the shape of the support governs the cross sectional shape of the wing from root to tip, causing the sheet to be bent into an arch construction which is inherently rigid and strong. No internal bracing of any type is necessary with a wing constructed in this manner.

Attention is now invited to Figs. 6 and 7 where the wing 14 is shown. It is made from the flat sheet 44 of bendable material having a shape different from that of Fig. 1. As in the construction of wing 12, a support is used to make the root section 49 by shaping the first edge 46 around the support to conform to its external configuration. With the bringing together of the edge portions 50 and 52 in order to define the trailing edge 54 of the wing 14, the leading edge 56 is formed and the cross sectional shape of the wing from root to tip is determined as a function of the support shape. In this embodiment there is a remaining edge 58 which is then sealed in order to form a substantially rectangular tip for the wing; or a closure that is geometrically similar to the support, but smaller, is used.

From the exterior appearance of the wings constructed in the manner described, they appear to be conventional. But, they are lighter and provide maximum storage volume, and yet have sufficient strength to serve their intended purpose. They are inherently rigid when the upper and lower surfaces, leading (usually rounded) and trailing edges are so made, requiring no internal support.

When an absolutely flat sheet of material is used and shaped as described previously, the leading and trailing edges of the wings are inherently straight, and element lines drawn from the root to the tip of the wing on its surfaces, are straight, thus causing the wing to be extremely resistant to flexural stress. If it were not for the fact that the sheet is flat, the straight line relation from tip to root would not be present and the wing would not be nearly so resistant to vertical loads, as applied by the lift of the wing while in flight.

It is apparent that various changes may be made in the specifically described embodiments of the invention without departing from the scope of the following claim.

The invention described herein may be manufactured and used by or for the Government of the United States of America for governmental purposes without the payment of any royalties thereon or therefor.

What is claimed is:

A method of producing an inherently rigid aircraft wing from a single flat, substantially square sheet of bendable metal, consisting of the steps of: shaping a corner of the sheet over the forward porttion of a root support to form the leading edge of the root section; shaping the two edges of the sheet adjacent said corner to the contours of the root support, thereby forming the remainder of the root section; and superposing, then securing together the remaining edges of the sheet, thereby forming the leading and trailing edges of the wing simultaneously.

References Cited in the file of this patent

UNITED STATES PATENTS

| Number | Name | Date |
|---|---|---|
| 1,685,881 | Nixon | Oct. 2, 1928 |
| 1,817,556 | Hamilton | Aug. 4, 1931 |
| 1,930,285 | Robinson | Oct. 10, 1933 |
| 1,942,222 | Squires | Jan. 2, 1934 |
| 2,019,272 | Ragsdale | Oct. 29, 1935 |
| 2,050,142 | White | Aug. 4, 1936 |
| 2,071,012 | Adams | Feb. 16, 1937 |
| 2,364,610 | Archer | Dec. 12, 1944 |
| 2,511,858 | Lampton | June 20, 1950 |

FOREIGN PATENTS

| Number | Country | Date |
|---|---|---|
| 332,898 | Germany | Feb. 1, 1921 |